(12) United States Patent  
Kahl

(10) Patent No.: US 6,478,501 B1  
(45) Date of Patent: Nov. 12, 2002

(54) COUPLING MEMBER FOR THE FACE END COUPLING OF PROFILE BARS

(76) Inventor: Helmut Kahl, Fossbrink 2, D-32457 Porta Westfalica (DE)

( * ) Notice: Subject to any disclaimer, the term of this patent is extended or adjusted under 35 U.S.C. 154(b) by 38 days.

(21) Appl. No.: 09/825,291

(22) Filed: Apr. 4, 2001

(30) Foreign Application Priority Data

Apr. 4, 2000 (DE) .......................................... 100 16 608

(51) Int. Cl.$^7$ ................................................. F16B 7/22
(52) U.S. Cl. ........................ 403/255; 403/381; 403/188
(58) Field of Search ................................. 403/381, 187, 403/188, 403, 255

(56) References Cited

U.S. PATENT DOCUMENTS

| | | | | |
|---|---|---|---|---|
| 4,641,983 | A | * | 2/1987 | Strassle .................. 403/255 X |
| 5,192,145 | A | * | 3/1993 | Rixen et al. ................. 403/255 |
| 5,265,972 | A | * | 11/1993 | Bahr ...................... 403/403 X |
| 5,785,359 | A | * | 7/1998 | Nagai et al. ............. 403/255 X |
| 5,816,734 | A | * | 10/1998 | Wahlin ....................... 403/362 |

FOREIGN PATENT DOCUMENTS

DE   4210456   * 10/1993

* cited by examiner

Primary Examiner—Lynne H. Browne  
Assistant Examiner—John R. Cottingham  
(74) Attorney, Agent, or Firm—Browdy and Neimark, P.L.L.C.

(57) ABSTRACT

A coupling member, for coupling profile bars having longitudinal grooves covered by profile walls so that a first profile bar is butt-jointed to a side wall of a second profile bar. The coupling member is inserted into the grooves aligned in one plane. The coupling includes an elongated counter holder insertable into the longitudinal groove of the first profile bar, and a tension tie incorporating a shaped head that is insertable into the longitudinal groove of the second profile bar and engages the profile walls from behind, and a shaft connected to the counter holder. The counter holder is rotatable on the tension tie by a pivot that engages the profile walls and is provided on one side with a tooth system that penetrates the groove bottom when the coupling member is tightened by rotating the counter holder.

16 Claims, 1 Drawing Sheet

COUPLING MEMBER FOR THE FACE END COUPLING OF PROFILE BARS

BACKGROUND OF THE INVENTION

1. Technical Field of the Invention

The present invention relates to a coupling member for the face end coupling of profile bars that are composed particularly of light metal and have undercut longitudinal grooves covered by profile walls except for an opening slit in such a way that a first profile bar is butt-jointed with one of its face ends to a side wall of a second profile bar and the coupling member is inserted into longitudinal grooves that align in one plane, comprising an elongated counter holder that is insertable into the longitudinal groove of the first profile bar and a tension tie incorporating both, a shaped head that is to be inserted into the longitudinal groove of the second profile bar and hooks into the profile wall of the longitudinal groove from behind, and a shaft that is connected to the counter holder, as it is known, for example, from DE 42 10 456 C2.

2. Object and Summary of the Invention

The present invention has made it its object to provide a coupling member according to the preamble that has a particularly simple design and permits a coupling of two profile bars at their face ends within the shortest possible time and either without, or with only the simplest tools.

This object is met according to the invention with a coupling member, particularly of steel, for the face end coupling of profile bars that are composed particularly of light metal and have undercut longitudinal grooves covered by profile walls except for an opening slit in such a way that a first profile bar is butt-jointed with one of its face ends to a side wall of a second profile bar and the coupling member is inserted into longitudinal grooves that align in one plane, comprising an elongated counter holder that is insertable into the longitudinal groove of the first profile bar and a tension tie incorporating both, a shaped head that is to be inserted into the longitudinal groove of the second profile bar and hooks into the profile wall of the longitudinal groove from behind, and a shaft that is connected to a counter holder. The coupling member wherein the counter holder is pivotally connected to the tension tie by means of a pivot that that hooks from underneath into the profile walls adjacent to the opening slit and is provided on one side with a tooth system that penetrates at least partially into the profile wall in the region of the groove bottom of the longitudinal groove when the coupling member is tightened by pivoting the counter holder from an insertion position. The counter holder projects from the longitudinal groove, to a tightened position, in which the counter holder is received inside the longitudinal groove, so that the counter holder moves away from the second profile bar during tensioning, resulting in a fastening of the profile bars.

The shaft may have a centering section adjacent to the shaped head, the thickness of which corresponds to the width of the opening slit of the longitudinal grooves. The centering section may have lateral flattened areas, the distance of which from one another corresponds to the width of the opening slit of the longitudinal groove. The shaped head may have lateral flattened areas, the distance of which from one another is smaller than the width of the opening slit of the longitudinal groove.

The counter holder advantageously has a width that corresponds to the width of the opening slit of the longitudinal groove.

The counter holder preferably has a forked section with two parallel legs that encompass a flattened end section of the shaft, and the pivot extends through the legs and the flattened end section.

A locking tooth is preferably disposed on each leg. The locking tooth may be designed barb-like.

The counter holder is advantageously designed at its free end section to cooperate with an assembly tool.

Provision is preferably made for the counter holder to have a securing means that cooperates with the profile wall of the longitudinal groove in a frictional or form-fitting manner in order to prevent an unintentional releasing or pivoting out of the tightened position.

BRIEF DESCRIPTION OF THE DRAWING

The invention will be explained in greater detail below based on an embodiment, with reference made to a drawing, in which.

DETAILED DESCRIPTION OF THE PREFERRED EMBODIMENT(S) OF THE INVENTION

Figure 1:
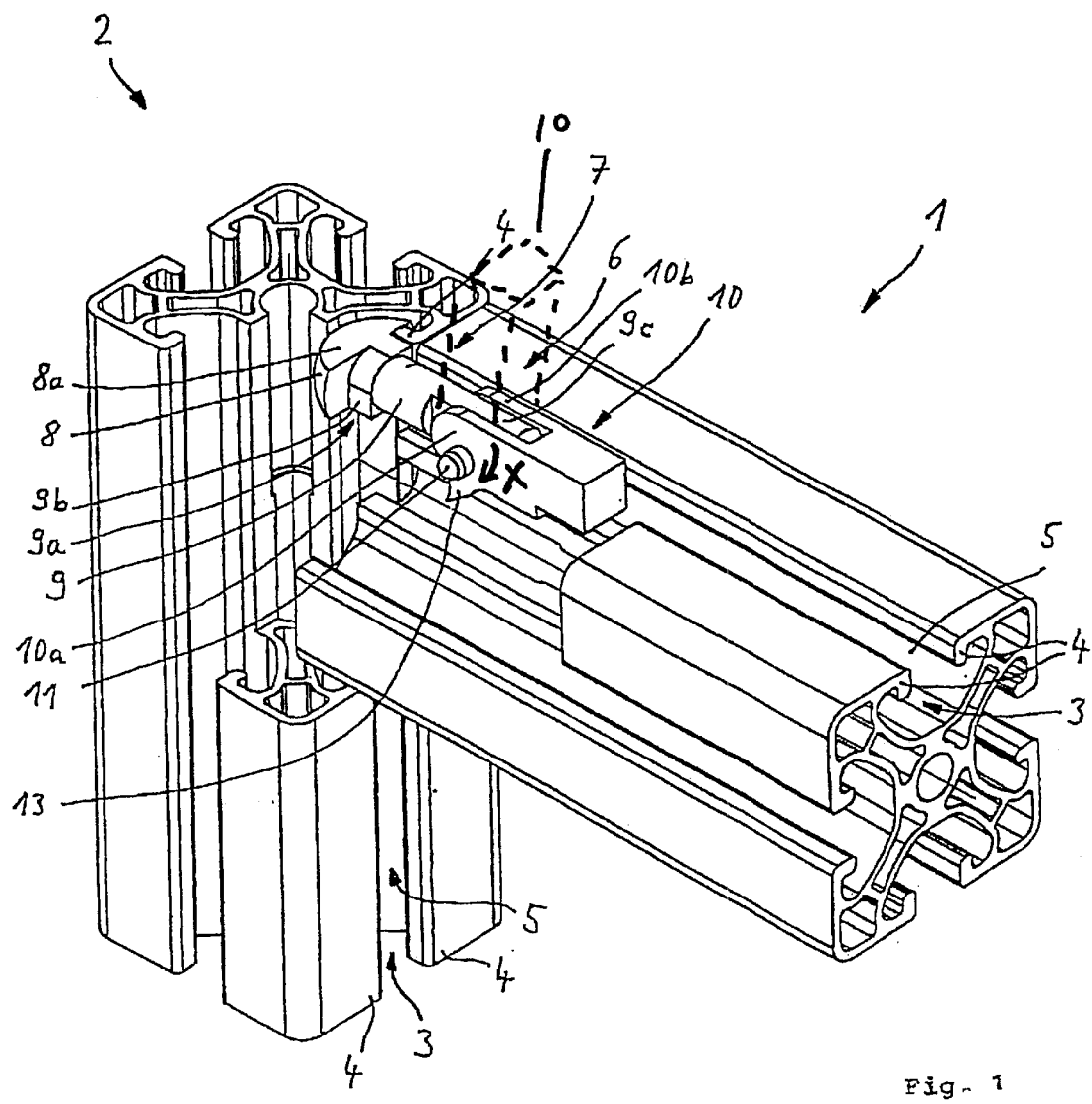
FIG. 1 shows a schematic, perspective view of the connection point of two profile bars that are connected to one another at a right angle using an inventive device.

FIG. 1 first shows two profile bars that are connected at a face end and crosswise, respectively, with a first profile bar 1 placed with its face end perpendicularly onto an outer surface of a second profile bar 2. In the present example, these are extruded aluminum profiles that have a substantially rectangular or square cross-section shape. In the region of the side walls, the profile bars 1 and 2 have undercut longitudinal grooves 3 that are partially covered by profile walls 4. This leaves open an opening slit 5 symmetrically towards the center of the longitudinal grooves 3 at the side walls of the profile bars, through which connecting means can be inserted. Overall, the longitudinal grooves 3 of the profile bars 1 and 2 including the region of the opening slit 5 have an approximately mushroom-shaped cross-section.

In the assembled arrangement of the two profile bars shown in FIG. 1, an inventive coupling member 6 is inserted into adjoining longitudinal grooves 3 of the two profile bars 1, 2, said longitudinal grooves being located in a common plane, so that the first profile bar 1 is fastenable with its face end against the corresponding longitudinal side of the second profile bar 2.

The coupling member 6 consists of three parts, namely (1) a tension tie 7 that incorporates both, a shaped head 8 that is to be inserted into the longitudinal groove 3 of the second profile bar 2 and hooks into the profile wall 4 of the longitudinal groove from behind, and a shaft 9; (2) a counter holder 10 to be received in the longitudinal groove of the first profile bar 1, as well as (3) a pivot 11 that connects the two above parts in a manner so that they can pivot.

The shaped head 8 has flattened areas 8a on both sides, in the regions of which the width of the shaped head 8 is smaller than the opening width of the opening slit 5 of the longitudinal groove 3, so that the shaped head 8 can be turned by 90° after its insertion into the longitudinal groove 3 to permit insertion of the shaped head at any random point in the given longitudinal groove 3.

Adjacent to the shaped head 8, the shaft 9 has, on a centering section 9a, lateral flattened areas 9b that are offset by 90° relative to the flattened areas 8a of the shaped head and which, in the inserted condition, ensure a centered seat of the tension tie relative to the longitudinal groove 3.

The counter holder 10 to be received in the longitudinal groove 3 of the first profile bar 1 has a forked section with two parallel legs 10a, 10b with which it encompasses a flattened end section 9c of the shaft 9 and is held pivotable on the same by means of the pivot 11. The pivot 11 hooks into the profile walls 4 of the longitudinal groove 3 from underneath with its end sections that project beyond the legs 10a, 10b.

The legs 10a, 10b of the counter holder 10 each have on their underside facing away from the opening slit 5 a locking tooth 13 which penetrates into the material of the profile bar 1 on the groove bottom of the longitudinal groove 3 when the counter holder 10 is rotated around pivot 11 in direction x from an insertion position shown in phantom, in which the counter holder projects at an angle upward from the longitudinal groove 3, into the shown tightening position, in which the counter holder is completely received within the longitudinal groove 3 and disappears in the cross-section profile of the profile bar 1.

To create the shown cross-connection, the profile bars 1, 2 and the coupling member 6 are initially joined loosely, with the counter holder 10 located at an angle of, e.g., 90° to the longitudinal axis of the tension tie 7 in an insertion position. After arranging the profile bars in the desired assembly position, the counter holder 10 is pivoted in direction x to the tightening position shown in FIG. 1, which may be done, for example, with a tool (a wrench or the like) that grasps the free end section of the counter holder, said free end section having a rectangular or square cross-section. At a certain point during the pivoting movement, the locking teeth 13 start to dig into the material of the profile wall in the region of the groove bottom of the longitudinal groove 3, causing, at the same time, a pivot point to be set for a pivoting movement of the counter holder 10 that is superimposed to its pivot movement around the pivot 11. This pivot movement also results in a displacement of the pivot 11 and tension tie 7 that is directed away from the second profile bar 2, resulting in a fastening of the elements, with the generated tie force being transferred on the one hand by the shaped head 8 onto the profile walls 4 of the profile bar 2 in the region of the opening slit 5 and, on the other hand, via the locking teeth 13 into the material of the profile wall of the profile bar 1 in the region of the groove bottom of the longitudinal groove 3.

To prevent the cross-connection that has been created in this manner from being inadvertently released, the counter holder cooperates with the profile wall 4 in a frictional or form-fitting manner, e.g., a frictionally engaged connection to the lateral edges of the opening slit 5.

To attain an increased resistance of the connection against canting and twisting, two inventive coupling members are advantageously used in a face end coupling of two profile bars according to FIG. 1.

What is claimed is:

1. A coupling member, for the face end coupling of profile bars (1, 2) that are composed of light metal and have undercut longitudinal grooves (3) covered by profile walls (4) except for an opening slit (5), wherein a first profile bar (1) is butt-jointed with one face end to a side wall of a second profile bar (2) and the coupling member (6) is inserted into longitudinal grooves (3) that align in one plane, the coupling member comprising an elongated counter holder (10) that is insertable into the longitudinal groove (3) of the first profile bar (1), and a tension tie (7) incorporating both, a shaped head (8) that is to be inserted into the longitudinal groove (3) of the second profile bar (2) and hooks into the profile wall (4) of the longitudinal groove (3) from behind, and a shaft (9) that is connected to the counter holder (10), wherein the counter holder (10) is pivotally connected to the tension tie (7) by means of a pivot (11) that hooks from underneath into the profile walls (4) adjoining the opening slit (5) and is provided on one side with a tooth system (13) that penetrates at least partially into the profile wall (4) in the region of the groove bottom of the longitudinal groove (3) when the coupling member (6) is tightened by pivoting the counter holder (10) from an insertion position, in which the counter holder (10) projects from the longitudinal groove (3), to a tightened position, in which the counter holder (10) is received inside the longitudinal groove (3), so that the counter holder (10) moves away from the second profile bar (2) during tightening while fastening the profile bars (1, 2).

2. A coupling member according to claim 1, wherein the shaft (9) has, adjacent to the shaped head (8), a centering section (9a), the thickness of which corresponds to the width of the opening slit (5) of the longitudinal groove (3).

3. A coupling member according to claim 2, wherein the centering section (9a) has lateral flattened areas (9b), the distance of which from one another corresponds to the width of the opening slit (5) of the longitudinal groove (3).

4. A coupling member according to claim 1, wherein the shaped head (8) has lateral flattened areas (8a), the distance of which from one another is smaller than the width of the opening slit (5) of the longitudinal groove (3).

5. A coupling member according to claim 1, wherein the counter holder (10) has a width that corresponds to the width of the opening slit (5) of the longitudinal groove (3).

6. A coupling member according to claim 1, wherein the counter holder (10) has a forked section with two parallel legs (10a, 10b) that encompass a flattened end section (9c) of the shaft (9), with the pivot (11) extending through the legs (10a, 10b) and the flattened end section (9c).

7. A coupling member according to claim 6, wherein the tooth system comprises a locking tooth (13) is disposed on each leg (10a, 10b).

8. A coupling member according to claim 7, wherein the locking tooth (13) is a barb.

9. A coupling member according to claim 1, wherein the counter holder (10) is designed at a free end section to cooperate with an assembly tool.

10. A coupling member according to claim 1, wherein the counter holder (10) incorporates a securing means that cooperates with the profile wall (4) of the longitudinal groove (3) in a frictional or form-fitting manner to prevent an unintentional pivoting out of the tightening position.

11. A coupling member according to claim 1, wherein the coupling member is made from steel.

12. A coupling member according to claim 2, wherein the shaped head (8) has lateral flattened areas (8a), the distance of which from one another is smaller than the width of the opening slit (5) of the longitudinal groove (3).

13. A coupling member according to claim 2, wherein the counter holder (10) has a width that corresponds to the width of the opening slit (5) of the longitudinal groove (3).

14. A coupling member according to claim 2, wherein the counter holder (10) has a forked section with two parallel legs (10a, 10b) that encompass a flattened end section (9c) of the shaft (9), with the pivot (11) extending through the legs (10a, 10b) and the flattened end section (9c).

15. A coupling member according to claim 2, wherein the counter holder (10) is designed at a free end section to cooperate with an assembly tool.

16. A coupling member according to claim 2, wherein the counter holder (10) incorporates a securing means that cooperates with the profile wall (4) of the longitudinal groove (3) in a frictional or form-fitting manner to prevent an unintentional pivoting out of the tightening position.

* * * * *